US006875104B2

(12) United States Patent
Hara

(10) Patent No.: US 6,875,104 B2
(45) Date of Patent: Apr. 5, 2005

(54) TOTALIZATOR TERMINAL, WINNING HORSE PICKING METHOD AND PROGRAM

(75) Inventor: Masanori Hara, Inagi (JP)

(73) Assignee: Fujitsu Limited, Kawasaki (JP)

( * ) Notice: Subject to any disclaimer, the term of this patent is extended or adjusted under 35 U.S.C. 154(b) by 356 days.

(21) Appl. No.: 10/132,306

(22) Filed: Apr. 26, 2002

(65) Prior Publication Data

US 2003/0144046 A1 Jul. 31, 2003

(30) Foreign Application Priority Data

Jan. 31, 2002 (JP) ....................................... 2002-023385

(51) Int. Cl.[7] ................................................ G06F 17/00

(52) U.S. Cl. ............................. 463/6; 463/463; 463/25; 463/28; 463/40; 463/42

(58) Field of Search ................................ 463/6, 25, 28, 463/40, 42

(56) References Cited

U.S. PATENT DOCUMENTS

| | | | | | |
|---|---|---|---|---|---|
| 3,697,698 | A | * | 10/1972 | Oswald et al. | 370/242 |
| 4,108,364 | A | * | 8/1978 | Tanaka et al. | 235/419 |
| 4,322,612 | A | * | 3/1982 | Lange | 463/28 |
| 4,373,723 | A | * | 2/1983 | Brown et al. | 463/6 |
| 5,374,060 | A | * | 12/1994 | Goldberg | 273/139 |
| 5,411,258 | A | * | 5/1995 | Wilson et al. | 463/6 |
| 5,830,068 | A | * | 11/1998 | Brenner et al. | 463/42 |
| 6,309,307 | B1 | * | 10/2001 | Krause et al. | 473/274 |
| 6,722,980 | B2 | * | 4/2004 | Stronach | 463/25 |
| 2002/0010022 | A1 | * | 1/2002 | Vincent | 463/42 |

FOREIGN PATENT DOCUMENTS

JP 11306256 A * 11/1999 ........... G06F/19/00

* cited by examiner

*Primary Examiner*—Derris H. Banks
*Assistant Examiner*—Jason Skaarup
(74) *Attorney, Agent, or Firm*—Staas & Halsey LLP

(57) ABSTRACT

The totalizator terminal of the present invention comprises a ticket issuing unit which selects an odd or even horse or gate number of a horse expected to be the first for all races, and a repaying unit which determines an amount of repayment for a picking ticket by dividing a total amount of repayment accounting for a prescribed ratio relative to a total amount of purchases by a number of hits. The ticket issuing unit vends picking tickets by recognizing the result of selection of the odd or even horse or gate number of the horse expected to be the first as specified by a purchaser for races 1 to 12. The ticket issuing unit can also vend picking tickets by automatically selecting the most popular horse upon purchasing or at random an odd or even horse or gate number.

15 Claims, 12 Drawing Sheets

TOTALIZATOR TERMINAL, WINNING HORSE PICKING METHOD AND PROGRAM

BACKGROUND OF THE INVENTION

1. Field of the Invention

The present invention relates to a totalizator terminal performing issuance and repayment of winning horse picking tickets, a winning horse picking method and a program therefor. More particularly, the invention relates to a totalizator terminal for conducting winning horse picking for full races, a winning horse picking method and a program therefor.

2. Description of the Related Arts

In a totalizator terminal, serving as a picking ticket vending machine, installed in a race track or in an off-track betting office, there are available the following forms of winning horse picking tickets to be purchased:

Win—selecting one horse to finish first (TANSHO—picking only the first);

Place—selecting one horse to finish first, second or third (FUKUSHO—picking a horse among those of the first to third);

Quinella—selecting two horses by horse number to finish first in either order (UMAREN—picking horses of the first and second);

Bracket Quinella—selecting two brackets to finish in order (WAKUREN—picking gates of the horses of the first and second);

Box—Bracket Quinella, Quinella, Quinella Place (Wide) and Exacta, marking twp to eight brackets numbers or two to ten horse numbers (BOX—picking a combination of horses of the first and second from among all the combinations of three or more selected horses);

Wheel—Bracket Quinella, Quinella, Quinella Place (Wide) and Exacta, marking one bracket or one horse number (NAGASHI—picking a horse of the first or second, centering around the horse of the first or second); and Quinella Please—selecting two horses by horse number to finish first, second or thord in any order (WIDE—picking two horses of the first to third).

In the above-mentioned forms of purchase in the conventional winning horse picking including TANSHO, FUKUSHO, UMAREN, WAKUREN, BOX, NAGASHI and WIDE are for purchases relative to each single race in all cases. One to twelve races are usually held a day, but there is unavailable a form of purchase representing forecasting of winning horses throughout the entire races of the day. For soccer games of the J-League, on the other hand, a soccer lottery known as "toto" is available, and is enjoying a very high popularity. In "toto", people expect win, draw or loss for all the 13 games. Successful picking for al the 13 games is a hit.

SUMMARY OF THE INVENTION

According to the present invention, there are provided a totalizator terminal which provides a new picking method of guessing and purchasing winning horses for all races, a winning horse picking method and a program therefor. The present invention provides a totalizator terminal for a new picking regime of a winning horse permitting guessing and purchasing tickets for all the one to twelve races, not for only a single race. This totalizator terminal comprises a ticket issuing unit which vends picking tickets by selecting an odd or even horse or gate number of a horse guessed to be the first for all races to be held a day; and a repaying unit which determines an amount of repayment by the picking ticket by dividing the total amount of repayment accounting for a prescribed ratio relative to the total amount of purchases by the number of winning tickets. In this totalizator terminal, the ticket issuing unit vends picking tickets by recognizing the result of selection of an odd or even horse or gate number of a horse guessed to be the first as specified by purchasers for all the one to twelve races (self-selection mode). The method of the present invention is thus based on guessing whether the horse number or the gale number of the horse being the first to come in is an odd or even number for each of one to twelve races. If the result is as expected for all the races, it would be a hit. In the "toto" lottery of soccer, win, draw or lose is guessed and there are 13 games in total. There would therefore be 1.6 million possible combinations in total. In the present invention, in contrast, numbers are limited to two kinds including odd and even numbers with 12 races, making 4,000 combinations in total. This leads to a higher probability and an easier hit. This makes it easier for fans to purchase tickets, resulting in a higher chance for horse racing to be in news and an increase in the number of fans.

The ticket issuing unit vends picking tickets by automatically selecting an odd or even horse or gate number of a most popular horse upon purchase for all races (automatic random selection mode). This possibility to specify the purchase form automatically selecting an odd or even horse or gate number for all races make it possible even for a beginner of horse racing to buy tickets as if it were a raffle. The ticket issuing unit of the invention can, furthermore, vend picking tickets by selecting an odd or even horse or gate number as specified by a purchaser for a race as specified by the purchaser, and simultaneously, by automatically selecting an odd or even horse or gate number of the most popular horse upon purchase or specified at random for races not as yet specified. A purchaser may therefore specify an odd or even horse or gate number for specific races in which he or she is particularly interested, and adopt automatic selection for the other races. The ticket issuing unit vends picking tickets by selecting an odd or even horse or gate number for all the races on the basis of read-out picking cards. The repaying unit repays first prize money for hit in all races, second prize money for loss in one race, and third prize money for loss in two races.

The present invention provides a winning horse picking method. This method comprises a ticket issuing step of vending a picking ticket by selecting an odd or even horse or gate number of a horse guessed to be the first in all races held a day; and a repaying step of determining an amount of repayment for the picking tickets by dividing a total amount of repayment accounting for a prescribed ratio to a total amount of purchases by a number of winning tickets.

The present invention provides a program for picking a winning horse. This program comprises causing a computer to execute a ticket issuing step of vending picking tickets by selection an odd or even horse or gate number of a horse expected to come in first in a ticket issuing step of vending picking tickets by selecting an odd or even horse or gate number of a horse expected to be the first for all races to be held a day; and a repaying step of determining an amount of repayment by dividing a total amount of repayment accounting for a prescribed ratio to a total amount of purchases by a number of winning tickets. The details of the winning horse picking method and the program there for are basically the same as those of the totalizator terminal. The above and other objects, features, and advantages of the present invention will become more apparent from the following detailed description with reference to the drawings.

DETAILED DESCRIPTION OF THE PREFERRED EMBODIMENTS

Figure 1:
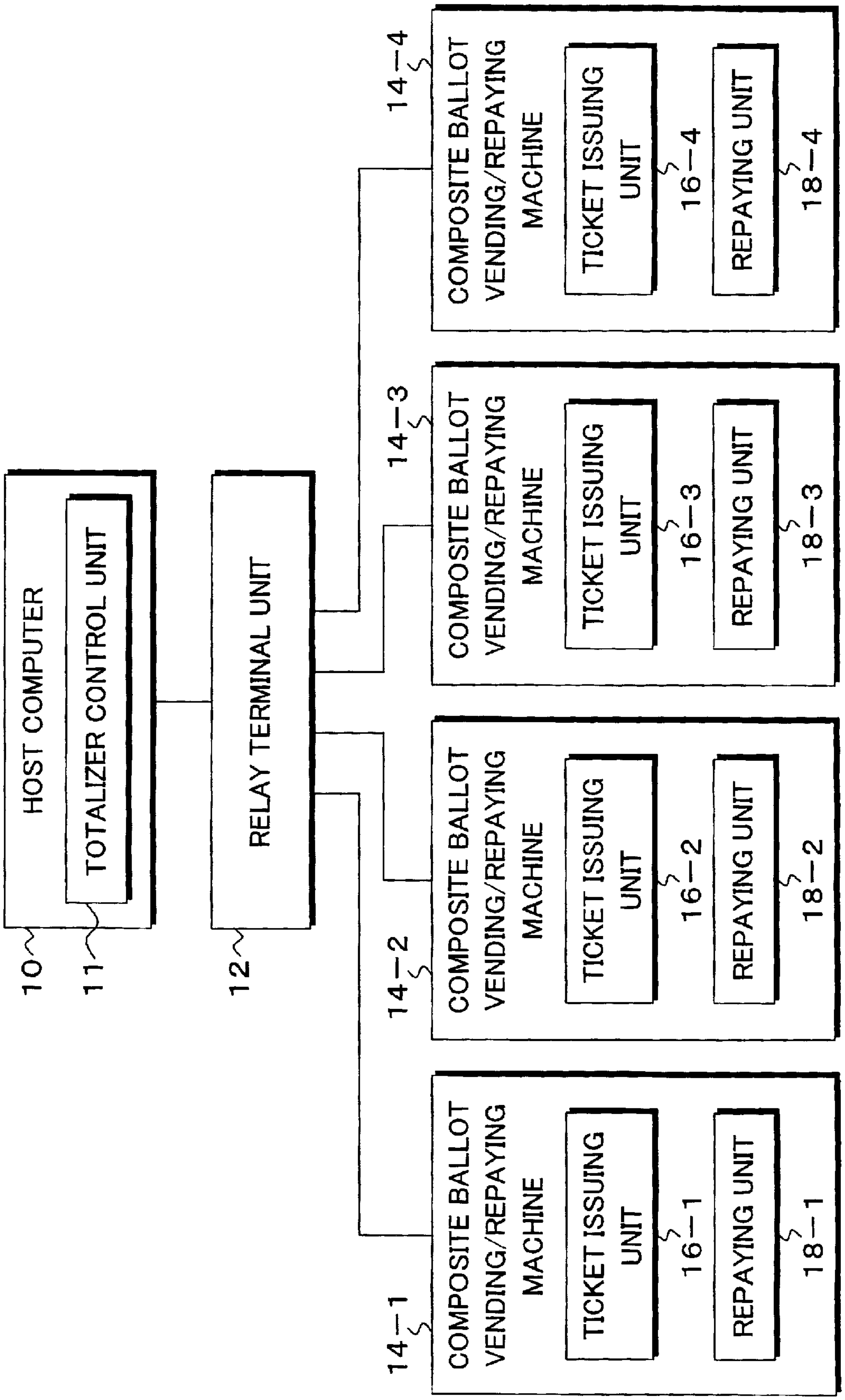
FIG. 1 is a descriptive view of a totalizator system to which the present invention is applied.

FIG. 1 is a descriptive view of a totalizator system to which the present invention is applied. The totalizator system comprises a host computer 10, a relay terminal unit 12, a composite ticket vending/repaying machines 14-1 to 14-4 serving as totalizator terminals. The host computer 10 has a function of a totalizator control unit 11 and executes comprehensive control regarding vending of winning horse picking tickets, and repayment of vended picking tickets in the composite ticket vending/repaying machines 14-1 to 14-4 connected via the relay terminal unit 12. The composite ticket vending/repaying machines 14-1 to 14-4 are installed in a race track or an off-track betting office. While a case with four such machines is described in this system configuration to achieve a simpler explanation, many composite ticket vending/repaying machines are installed in each race track or off-track betting office via independent relay terminal units 12. The composite ticket vending/repaying machines 14-1 to 14-4 are provided with functions of ticket issuing units 16-1 to 16-4 and repaying units 18-1 to 18-4. Each of the ticket issuing units 16-1 to 16-4 vends tickets of the new picking regime which has selected an odd or even horse or gate number of a horse expected to be the first for all the races usually including from one to twelve races. There are available the following three modes of issuance of the tickets of the new picking regime to be executed by the ticket issuing units 16-1 to 16-4:

(1) Self-selection mode;
(2) Automatic popularity selection mode; and
(3) Automatic random selection mode.

The self-selection mode comprises the steps of recognizing the result of selection of an odd or even horse or gate number expected to be the first as specified by a purchaser for one to twelve races, and vending tickets. The automatic popularity selection mode comprises the steps of automatically selecting an odd or even horse or gate number of a most popular horse upon purchasing, and vending tickets. The automatic random selection mode comprises the steps of automatically selecting at random an odd or even horse or gate number for one to twelve races, and vending tickets. On the other hand, the repaying units 18-1 to 18-4 determines an amount of repayment of picking tickets sold by dividing the total amount of repayment accounting for a prescribed ratio relative to a total amount of purchases by a number of winning tickets, and repays the same. Repayment of prize money is accomplished by, from among picking tickets based on an odd or even horse or gate number of a horse expected to be the first in one to twelve races, repaying the first prize money to hits for all the races, repaying the second prize money to loss for one race, and repaying the third prize money to loss for two races. When there is no hit for all the races, the prize money is carried over to the next one to twelve races.

Figure 2A:
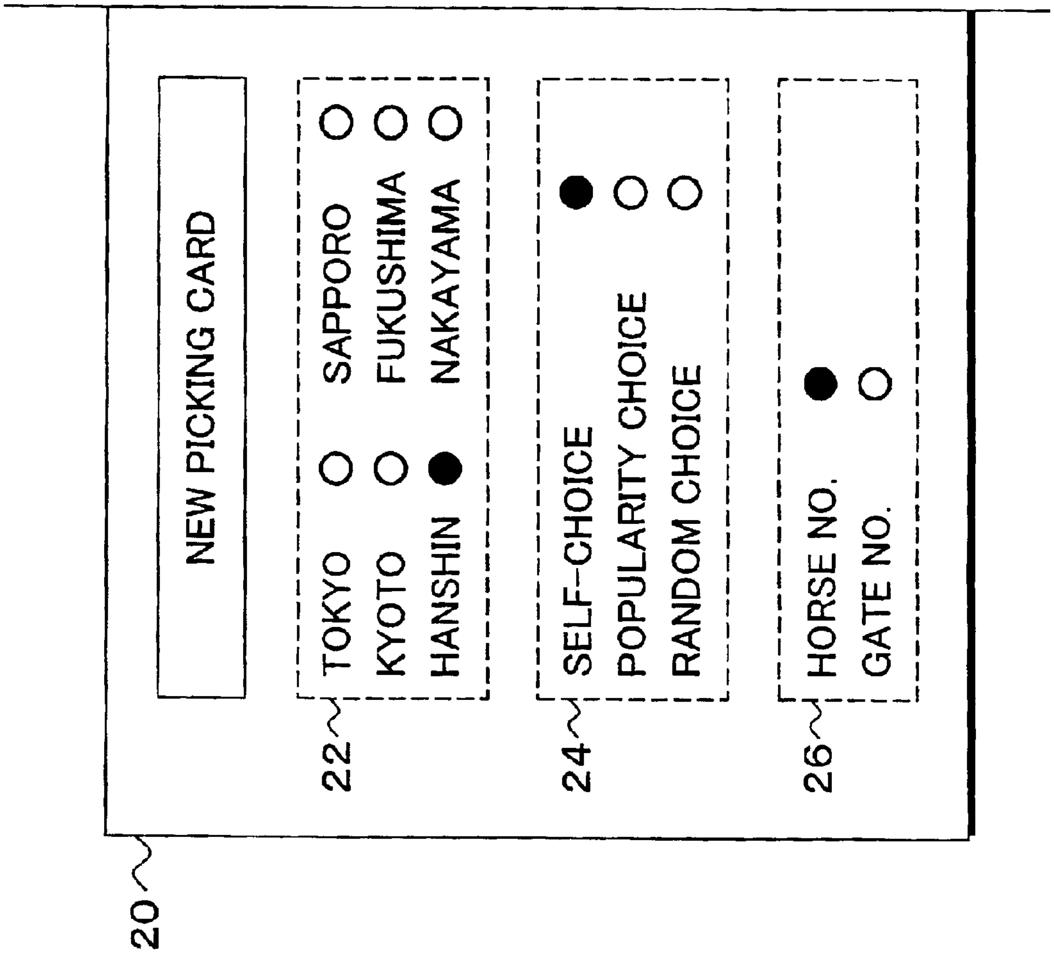
FIGS. 2A and 2B are descriptive views of a picking card of the new picking regime, which is read out by the totalizator terminal of the invention.
Figure 2B:
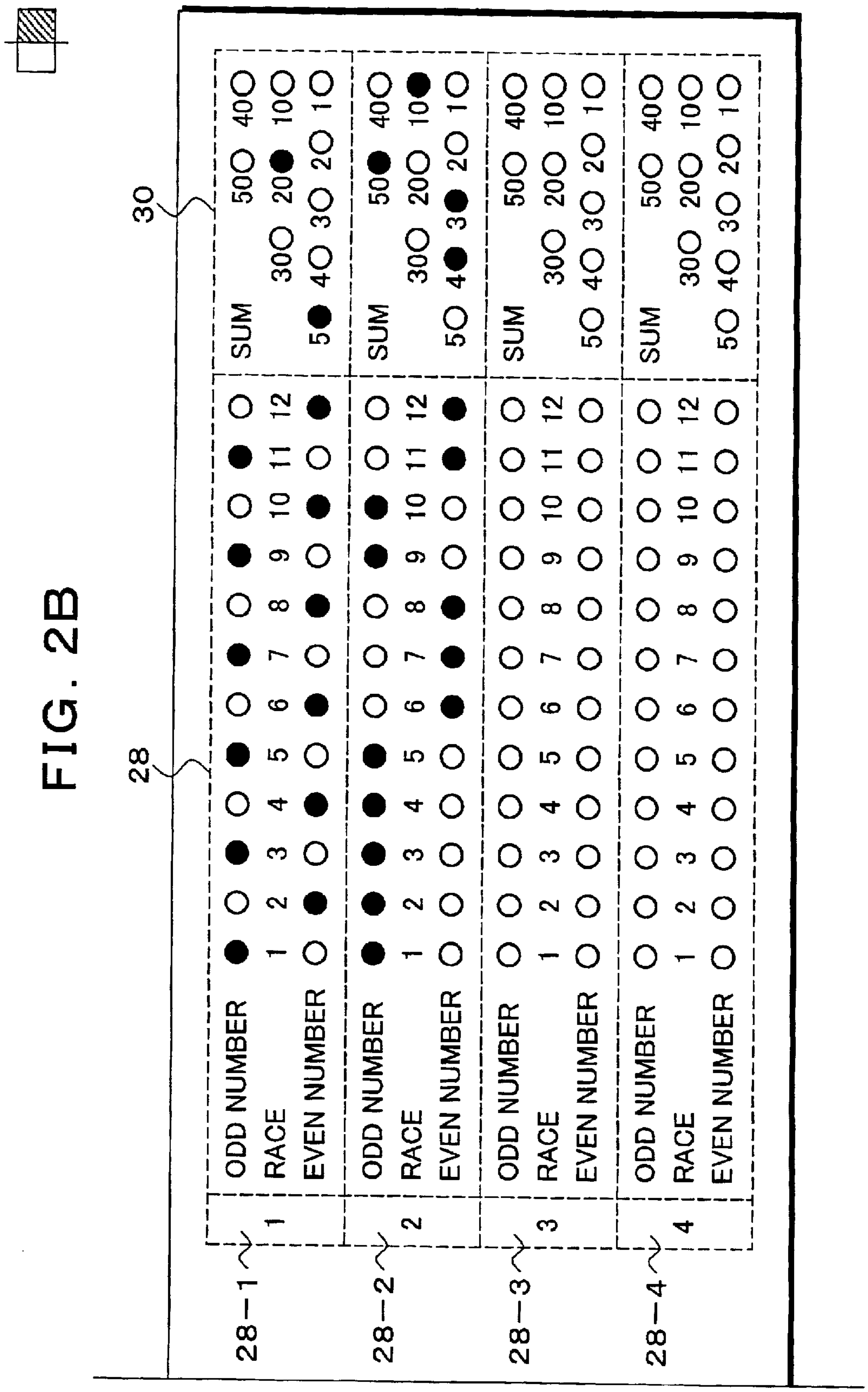

FIGS. 2A and 2B are descriptive views of a picking ticket coping with the new picking regime of the invention applicable for ticket issuance by the issuing unit 16-1 provided on the composite ticket vending/repaying machines 14-1 to 14-4 shown in FIG. 1. The picking card 10 of the new picking regime of the invention has a race track specifying column 22, a selection mode specifying column 24, a Horse No./Gate No. specifying column 26, a winning horse selecting column 28 and a purchase amount specifying column 30. In the race track specifying column 22 in this embodiment, race tracks "Tokyo", "Sapporo", "Kyoto", "Fukushima", "Hanshin" and "Nakayama" are displayed. A purchaser can specify a race track where a picking card is used by painting out one of white circles shown as a specifying box. In this embodiment, "Hanshin Race Track" is specified. In the selection mode specifying column 24, any one of the "self-selection mode", the "automatic popularity selection mode" and the "automatic random selection mode" can be specified. In this embodiment, the "self-selection mode" is specified by painting out in black one of the white circles serving as the specifying box. The Horse No./Gate No. specifying column 26 contains specifying boxes "Horse No." and "Gate No.". In this embodiment, the "Horse No." is specified by painting out in black one of the white circles serving as specifying boxes. The winning horse selecting column 28 is divided into picking columns 28-1 to 28-4 having numbers 1 to 4. When selecting the "self-selection mode", the purchaser can vote up to four winning horses. In this embodiment, winning horses are picked by using Nos. 1 and 2 picking columns 28-1 and 28-2. The winning horse selecting column 28 shows race Nos. 1 to 12, and an odd number box for expectation that the horse or gate number of the horse expected to be the first is an odd number is provided thereabove, and an even number box indicating that the horse or gate number of the horse expected to be the first is an even number is provided therebelow. In this embodiment, odd numbers are selected for races 1, 3, 5, 7, 9 and 11, and even numbers are selected for races 2, 4, 6, 8, 10 and 12. Numerals for selecting an amount in units of 100 yen are shown in the purchase amount specifying column 30. In this embodiment, an amount of 2,500 yen is specified for the picking column 28-1 of the winning horse selecting column 28, and an amount of 6,700 yen is specified for the picking column 28-2.

Figure 3A:
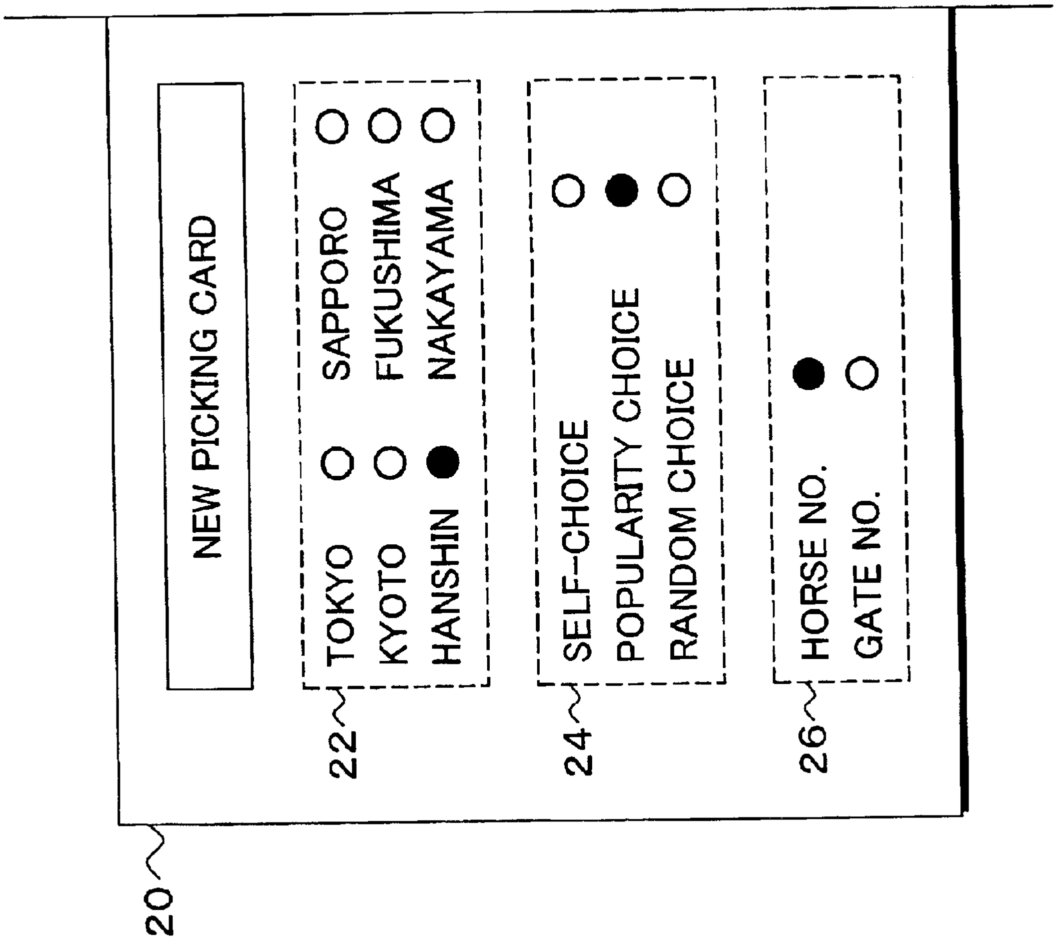
FIGS. 3A and 3B are descriptive views of a new regime picking card illustrating an example of entrance in which a most popular horse is automatically selected.
Figure 3B:
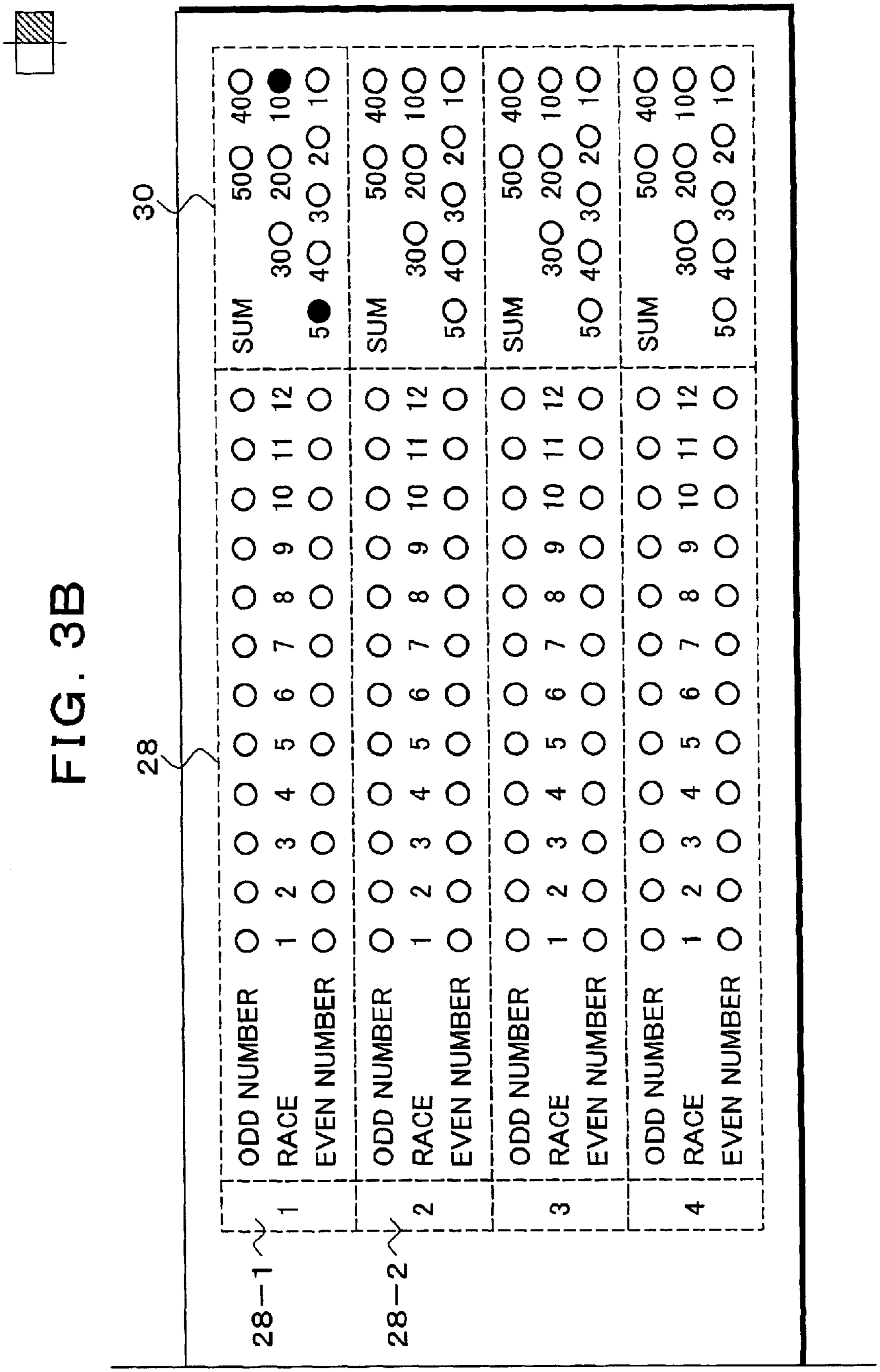

FIGS. 3A and 3B illustrating an example of specification of the "automatic popularity selection mode" in a new picking regime picking card 20. In order to specify the "automatic popularity selection mode", the box "Popularity Section" in the selection mode specifying column 24 is painted out in black. The manner of filling the race track specifying column 22 and the Horse No./Gate No. specifying column 26 is the same as in the case shown in FIG. 2. When "automatic popularity selection mode" has been specified, a horse number or a gate number of the most popular horse from odds upon purchase is automatically selected for all the races on theside of the composite ticket vending/repaying machines 14-1 to 14-4. It is not therefore necessary to select an odd or even horse or gate number for races 1 to 12. For the purchase amount specifying column 30, an amount of 1,500 yen is specified in this embodiment in the picking column 28-1. FIG. 3 shows an example of filling the picking card 20 of the new picking regime for the "automatic popularity selection mode". In the case of the "automatic random selection mode", it suffices to paint out in black the specifying box of "random selection" of the selection mode specifying column 24, and the other specifications are the same as in the "automatic popularity selection mode".

Figure 4A:
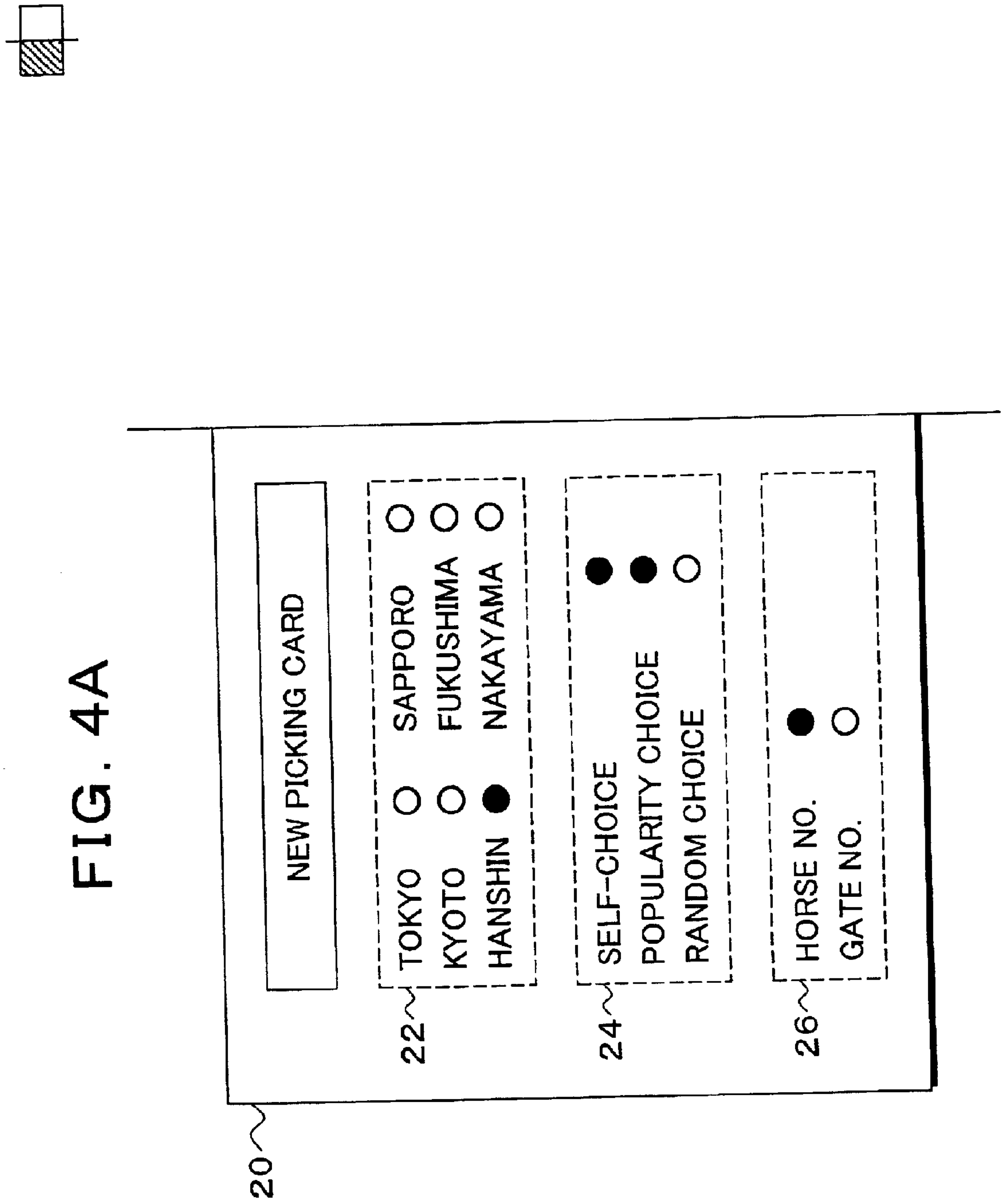
FIGS. 4A and 4B are descriptive views of a new regime picking card illustrating an example of entrance in which self-selection and automatic selection are combined.
Figure 4B:
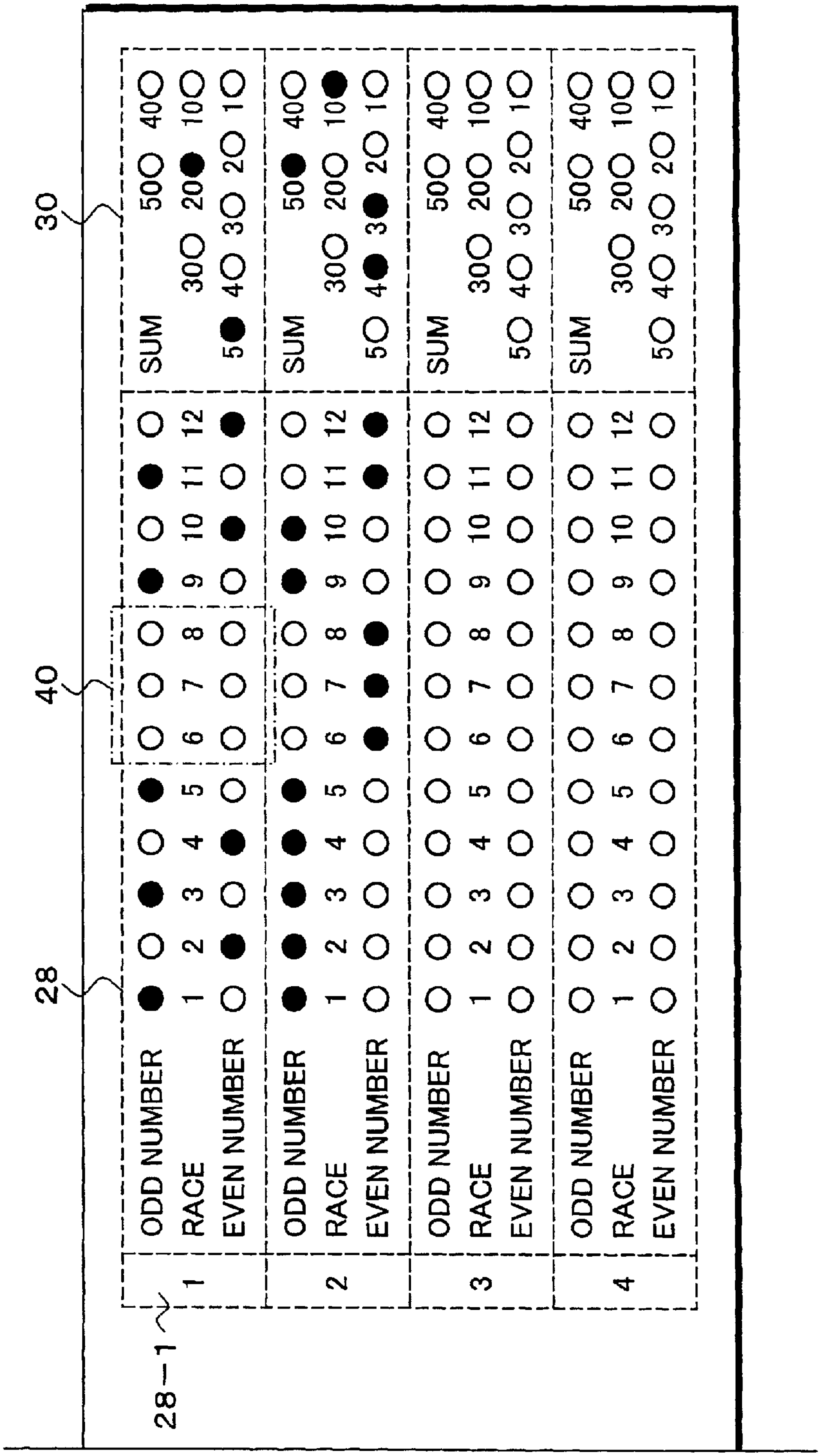

FIGS. 4A and 4B illustrate the new picking regime picking card 20 of the invention filled in the case where the "self-selection mode" shown in FIG. 2 is combined with the "automatic popularity selection mode" or the "automatic random selection mode" shown in FIG. 4. In the picking card 20 of the simultaneous use, the "self-selection mode" and the "automatic popularity selection mode" are specified by painting out the boxes "self-selection" and "popularity selection" in black. For the winning horse selecting column, in response to the above, the purchaser estimates a horse number for races 1 to 5 and 9 to 12 in the picking column 28-1 and makes a selection of an odd or even number by painting out in black an odd or even number as shown in FIG. 4. An odd or even number is not however selected for races 6 to 8. Automatic selection of the number of a horse expected to be the first based on the "automatic popularity selection mode" would be made for the portion 40 not as yet specified. In this simultaneous use, the purchaser picks whether the number of a horse expected to be the first is an odd or even number for races attracting the attention of the purchaser. For races in which the purchaser is interested, the purchasing manner may be such that the purchaser makes no pick for these races, but causes automatic selection of the number of the most popular horse from odds upon purchase from the odds upon purchasing.

Figure 5:
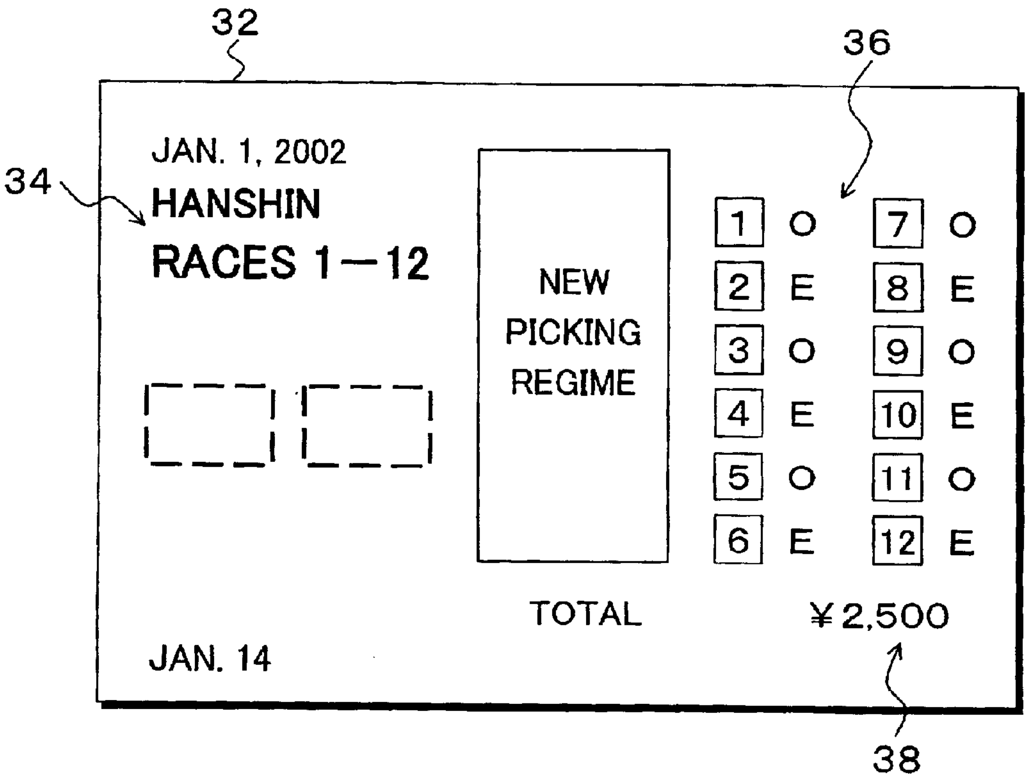
FIG. 5 is a descriptive view of a picking card sold in response to readout of the picking card shown in FIG. 2.

FIG. 5 illustrates an embodiment of the picking ticket in a case where a new picking regime picking card 20 having contents as shown in FIG. 2 is entered into, for example, the composite ticket vending/repaying machine 14-1 of FIG. 2, read out by the ticket issuing unit 16-1, and vended after issuance. At least a race track name 34, an expected winning horse 36 and a purchase amount 38 are displayed on this picking ticket 32. In the winning horse picking 36, if the horse number in the picking column 28-1 according to the "self-selection mode" is an odd number, it is indicated by a "O", and if an even number, by "E".

Figure 6A:
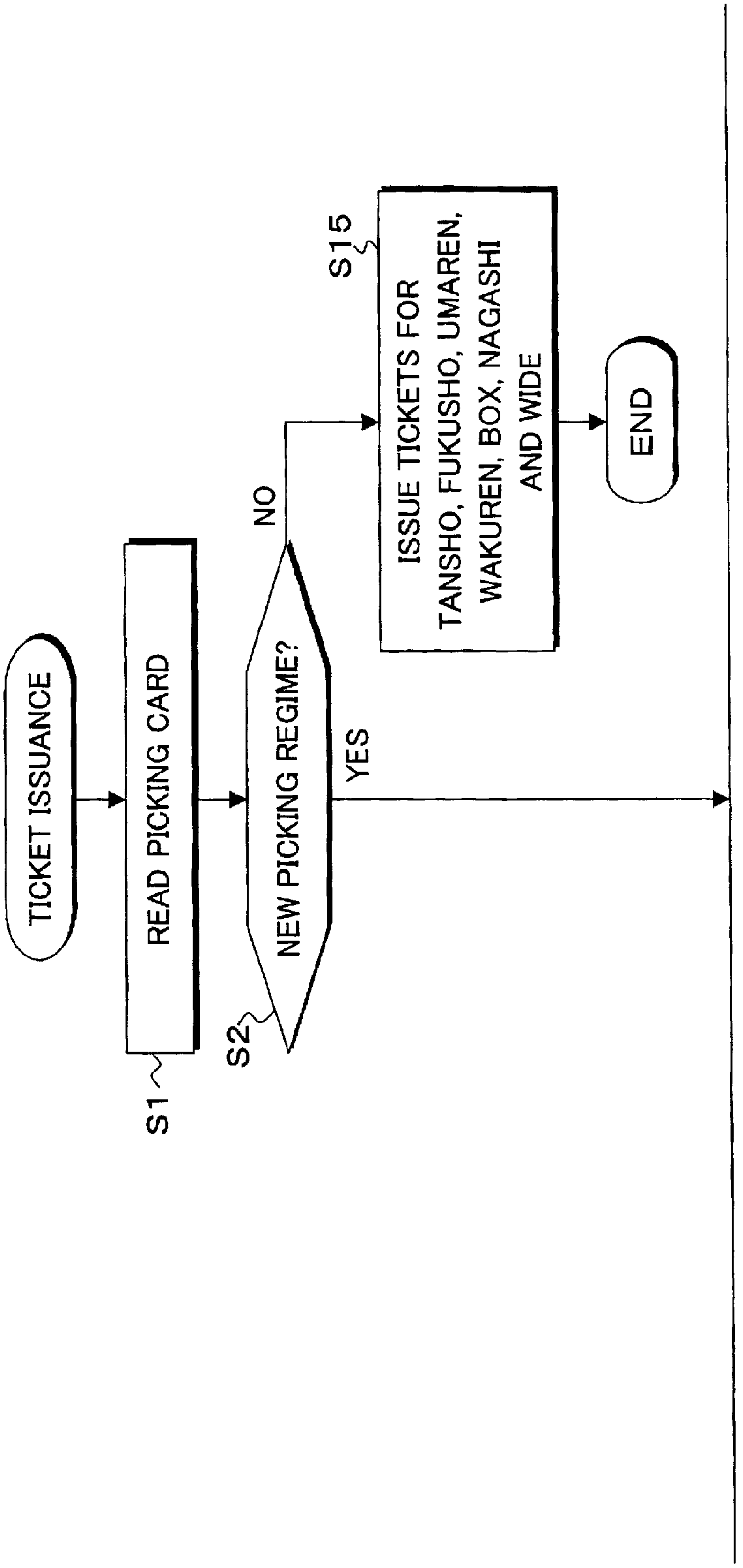
FIGS. 6A and 6B are flowcharts of ticket issuance according to the invention.
Figure 6B:
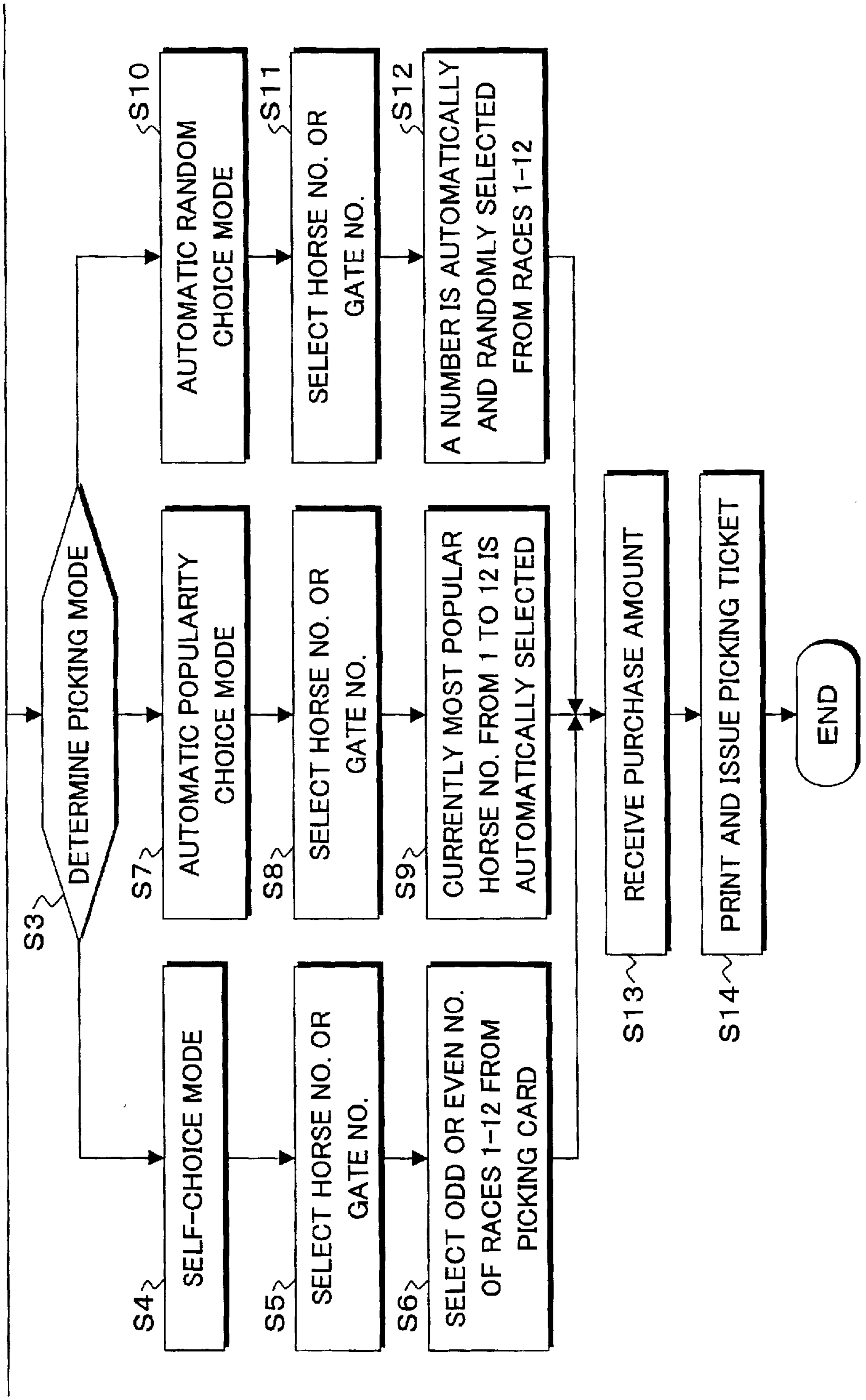

FIGS. 6A and 6B are flowcharts of ticket issuance by the ticket issuing units 16-1 to 16-4 provided in the composite ticket vending/repaying machines 14-1 to 14-4 serving as totalizator terminals of the invention. For this ticket issuing processing, for example, the picking card is read out in step S1 by inserting the new picking regime picking card 20 filled with necessary information into a card insertion port. Upon read-out of the picking card, it is checked whether or not the inserted card is a new picking regime picking card 20 as shown in FIG. 2 in step S2. If it is a picking card other than the new regime one, i.e., a conventional picking card, the process advances to step S16, and a ticket issuance process corresponding to the picking card such as TANSHO, FUKUSHO, RENSHO, WAKUREN, BOX, NAGASHI or WIDE is executed. In step S2, if the card is a new regime one, the process proceeds to step S3 to select a picking mode. When the "self-selection" has been specified as in FIG. 2, the process goes to the self-selection mode in step S4. In the self-selection mode, specification of a horse No. or a gate No. as written in the picking card is selected in step S5, and in step S6, odd numbers or even numbers for the races 1 to 12 as read out in step S6 are recognized and selected. In step S14, a purchase amount is read, and the thus read purchase amount is displayed to carry out receiving of the purchase amount by the purchaser in step S14. Upon the completion of receiving of the purchase amount, picking tickets 32 as shown in FIG. 6 are printed and issued in step S14. When "popularity selection" is read out from the picking card in step S3, the process advances to theautomatic popularity selection mode of step S7. In this automatic popularity selection mode, after recognizing the horse number of the gate number of the picking card in step S8, the horse number of the gate number of the post popular horse based on the odds upon purchase provided from the host computer 10 side is selected for all the races in step S9. After the receiving of the purchase amount in step S14, a picking ticket as shown in FIG. 5 containing printed odd Nos. or even Nos. for the races 1 to 12 as determined by the automatic popularity selection in step S15 is printed and issued. Furthermore, when the "random selection" is recognized from the picking card in step S4, the process proceeds to the automatic random selection mode of step S10. In this automatic random selection mode, a horse number of a gate number is selected from the picking card in step S11, and horse numbers or gate numbers of the horse expected to be the first are automatically selected for all the races 1 to 12 in step S13. After receiving of the purchase amount in step S4, picking tickets containing the printed horse numbers or the gate numbers for the races 1 to 12 as selected at random in step S5 as shown in FIG. 5 are printed and issued. As shown in the purchase amount specifying column 30 of FIG. 2, upon purchase of a picking ticket, a bet is 100 yen. The ending time of purchase of picking tickets is the same as the ending time of purchase for a race. In the flowcharts of ticket issuance shown in FIGS. 6A and 6B, for reading out a picking card in the combination mode specifying the self-section mode and the automatic popularity selection mode as shown in FIG. 4, two modes are recognized in the determination of the picking mode, and issuance of a picking ticket corresponding to the combination of the two modes is made possible by sequentially or simultaneously conducting the processing of the self-selection mode in steps S4 to S6 and the processing of the automatic popularity selection mode in steps S7 to S9 as recognized above.

Figure 7A:
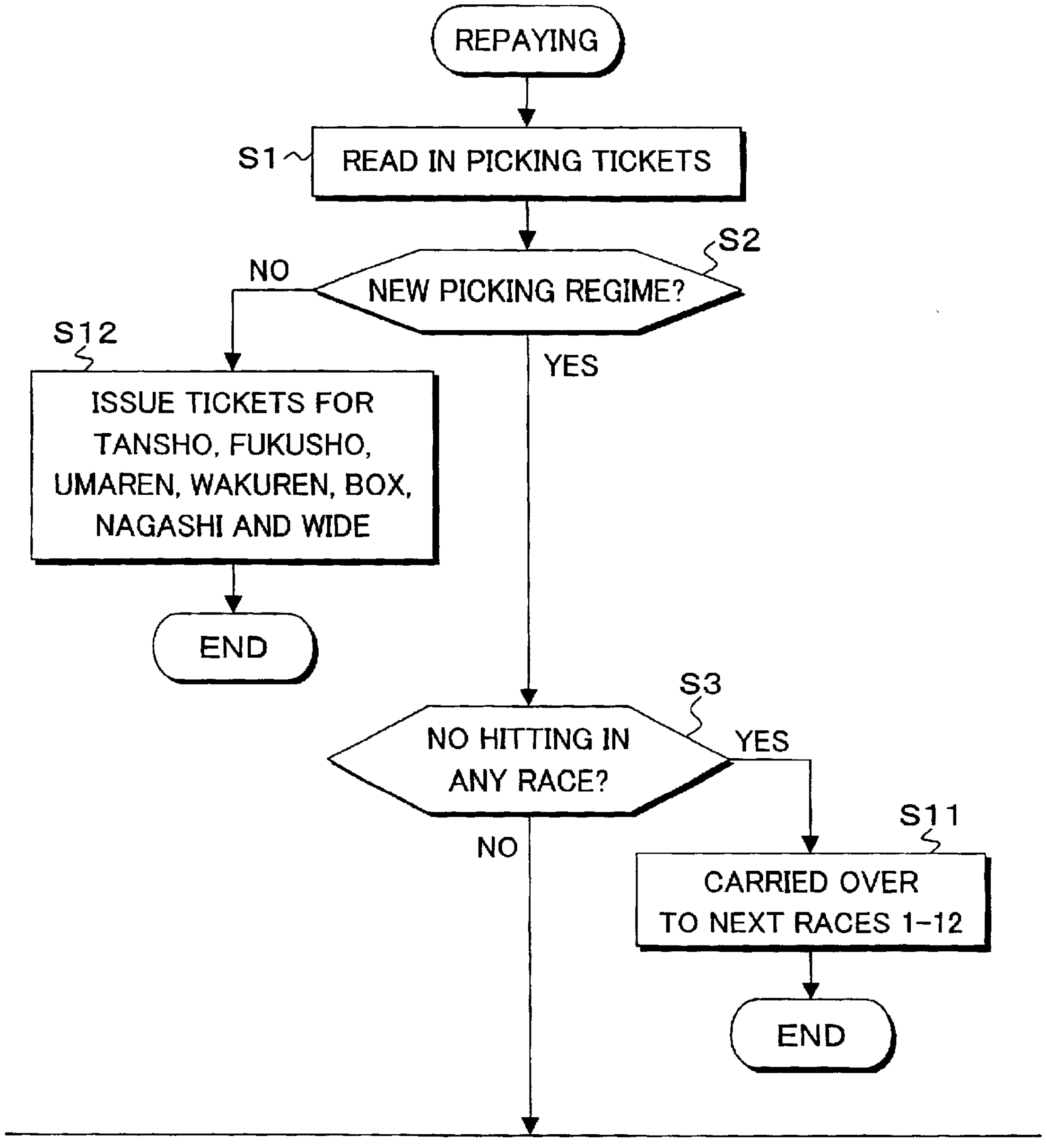
FIGS. 7A and 7B are flowcharts of repayment according to the invention.
Figure 7B:
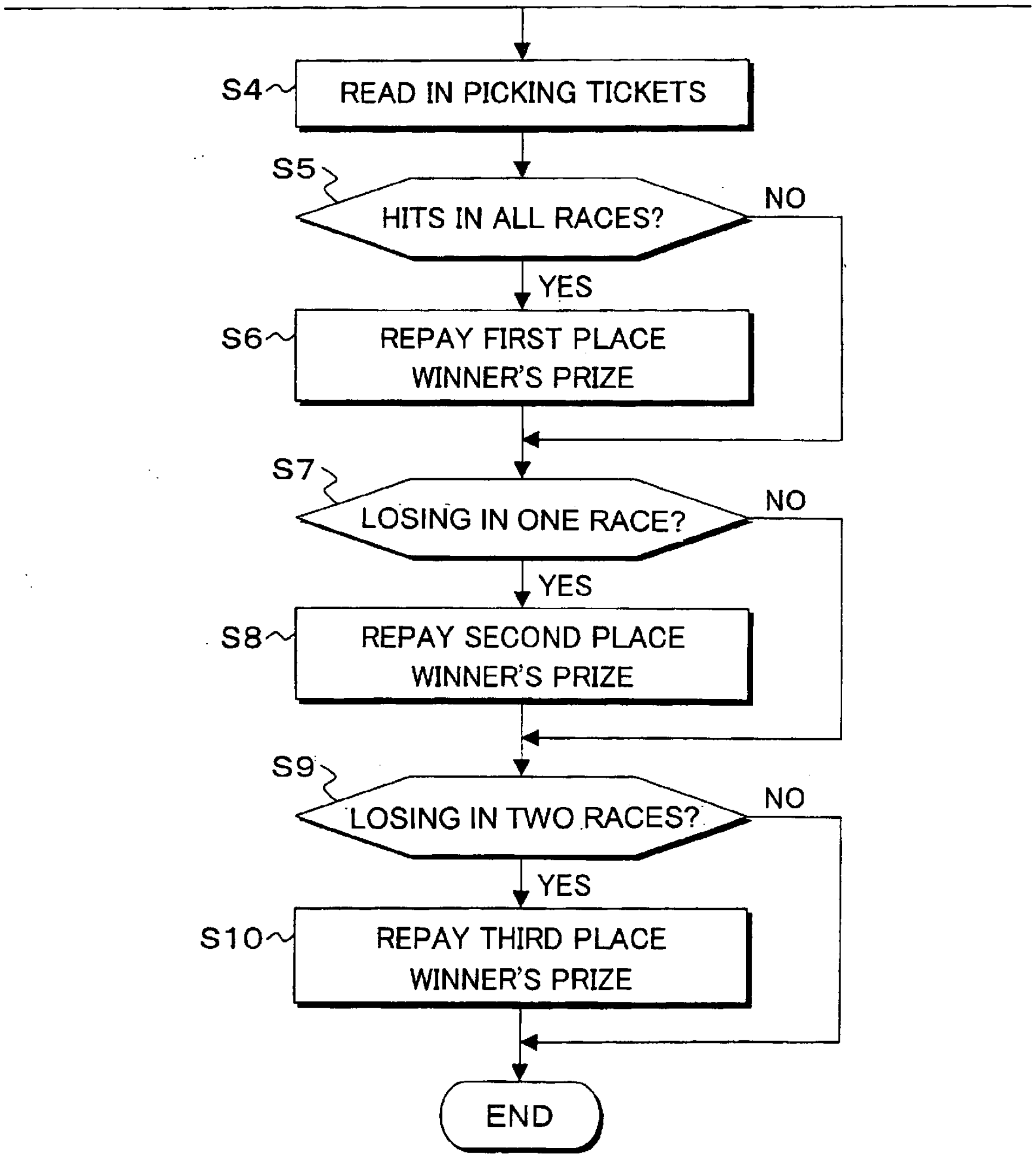

FIGS. 7A and 7B are flowcharts of repayment of the present invention by the repaying units 18-1 to 18-4 provided in the composite ticket vending/repaying machines 14-1 to 14-4 shown in FIG. 1. This repayment is performed after the completion of the 12 races. First in step S1, an issued picking ticket as shown in FIG. 6 is read out, and it is checked whether or not the ticket is a new regime one in step S2. If not, the process advances to step S12 in which a repaying processing according to the conventional picking mode such as TANSHO, FUKUSHO and RENSHO is carried out. If the ticket is based on the new picking regime, the process goes to step S3, and it is checked whether or not there is not hit for all the races for the already issued new regime picking tickets. When there is not hit for all the races, repayment is not executed, but the prize money is carried over to the next races 1 to 12 in step S11. When there one or more hits are present for all the races, it is checked whether or not these hits are for all the races In step S5 from the combinations of odd numbers and even numbers for 12 races of the picking tickets read out in step S4. If they are hits for all the races, the process proceeds to step S6, and the first prize money is repaid. For this first prize money, for example, the balance 75% of subtraction of 25% of the sales of the race track from the total amount of purchases (=number of purchases×\100.–) of the new picking regime is used as a total amount of repayment. Since the prize money to be repaid includes the first to the third, for example, the total amount of repayment is allocated 60% to the first, 10% to the second and 5% to the third. The amount obtained by dividing each of the thus allocated amounts by the number of hits would be the amount of dividend for each purchase of the first, second and third. As a result, for the first prize money of step S6, an amount obtained by multiplying the first prize money per purchase resulting from division of 60% of the total amount of repayment by the number of hits by the number of purchases of the read-out picking tickets would be repaid. To a purchase of loss in one race among all the races as determined in step S7, the second prize money is repaid in step S8. More specifically, an amount calculated by multiplying the second prize money per purchase obtained by dividing 10% of the total amount of repayment by the number of second hits by the number of purchases of the read-out picking tickets as the second prize money. To a purchase of loss in two races as determined in step S9, the third prize money is repaid in step S10. An amount calculated by multiplying the third prize money per purchase resulting from division of 5% of the total amount of repayment by the number of hits of the number of purchases of the read-out picking tickets would be repaid. On the other hand, when there is no hitting purchaser of the second or the third, the second and third repayment amounts are added to the first repayment amount and the resultant amount is repaid. When there is no first hitting purchaser, the prize money is carried over to the next 1 to 12 races as shown in step S11.

Repayment calculation information of the first to third prize monies in the repayment as shown in FIGS. 7A and 7B comprises the result of calculation in the totalizator control unit 11 provided in the host computer 10 shown in FIG. 2, which is received for execution. The flowcharts of ticket issuance shown in FIGS. 6A and 6B and the flowcharts of repayment shown in FIGS. 7A and 7B are installed as application programs in the computer portion building the composite ticket vending/repaying machines 14-1 to 14-4 shown in FIG. 1 and execute ticket issuance and repayment. The present invention provides also a machine-readable recording medium storing the programs having the contents of the ticket issuance flowcharts of FIGS. 6A and 6B and the flowcharts of repayment of FIGS. 7A and 7B. An embodiment of this recording medium is for example as follows.

The recording media storing the programs for embodying the winning horse picking regime of the invention include portable recording media such as a CDROM, a floppy disk (R), a DVD disk, a magneto-optical disk, and an IC card, memory units such as hard disks provided in and outside a computer system, a database holding programs via lines, other computer systems and databases thereof, and transfer media on a line. The programs of the recording medium of the invention, stored in such a portable recording medium are installed in a computer system built as hardware of the composite ticket vending/repaying machines 14-1 to 14-4 for execution.

According to the present invention, as described above, it is possible to provide quite a novel winning horse picking regime permitting purchase picking throughout the entire races, not picking for each race as in the conventional picking regime, by picking whether the horse number or the gate number of a horse expected to be the first for each race is an odd number or an even number, and considering hits in all races as winning. Appearance of this new picking method will attract the general attention and lead to an increase of fans. According to the picking method of the invention, the winning horse is picked by means of an odd or even number for twelve races, for example. This leads to 4,000 combinations in total, resulting in a higher hitting probability as compared with 1.6 million combinations of win, draw and lose for 13 games in the case of soccer lottery. Possibility to make picking for all the races in addition to that for a single race largely increases the range of selection in the winning horse picking, thus permitting expectation for horse race to become more popular and an increase in fans. As a method of purchase of picking tickets, in addition to self-selection, there are available the automatic selection of the most popular horse and the gate thereof for all the races from odds at the time of purchase, and an automatic selection mode at random for all the races. Even for beginners of horse race, therefore, it is possible to easily purchase picking tickets as in a raffle, thus permitting expectation of an increase in the horse race population and a remarkable improvement of sales.

The present invention is not limited to the, aforementioned embodiments, but includes appropriate variants without impairing the object and advantages. It is needless to mention, furthermore, that the present invention is not limited by the numerals appearing in the aforementioned embodiments.

What is claimed is:

1. A totalizator terminal comprising:

a ticket issuing unit which vends picking tickets by selecting either an odd or even horse number of a horse guessed to be first, or either an odd or even gate number of a horse guessed to be first for all races to be held a day; and a repaying unit which determines an amount of repayment for said picking tickets by dividing a total amount of repayment accounting for a prescribed ratio relative to a total amount of purchases by the number of winning tickets.

2. A totalizator terminal according to claim 1, wherein said ticket issuing unit vends picking tickets by recognizing the result of selection of an odd or even horse or gate number of a horse guessed to the first as specified by purchasers for all races.

3. A totalizator terminal according to claim 1, wherein said ticket issuing unit vends picking tickets by automatically selecting an odd or even horse or gate number of a most popular horse upon purchase for all races.

4. A totalizator terminal according to claim 1, wherein said ticket issuing unit vends picking tickets by automatically selecting an odd or even horse or gate number at random for all races.

5. A totalizator terminal according to claim 1, wherein said ticket issuing unit vends picking tickets by selecting an odd or even horse or gate number as specified by a purchaser for a race as specified by the purchaser, and simultaneously, by automatically selecting an odd or even horse or gate number of a most popular horse upon purchase at random for races not currently specified.

6. A totalizator terminal according to claim 1, wherein said ticket issuing unit vends picking tickets by selecting an odd or even horse or gate number for all the races on the basis of read-out picking cards.

7. A totalizator terminal according to claim 1, wherein said repaying unit repays a first prize money for a hit in all races, a second prize money for a loss in one race, and a third prize money for a loss in two races.

8. A winning horse picking method comprising:

a ticket issuing step of vending a picking ticket by selecting either an odd or even horse number of a horse guessed to be first, or either an odd or even gate number of a horse guessed to be first for all races held a day; and a repaying step of determining an amount of repayment for said picking tickets by dividing a total amount of repayment accounting for a prescribed ratio to a total amount of purchases by a number of winning tickets.

9. A method according to claim 8, wherein said ticket issuing step comprises vending picking tickets by recognizing the result of selection of an odd or even horse or gate number of a horse expected to be the first as specified by a purchaser for all races.

10. A method according to claim 8, where said ticket issuing step comprises vending picking tickets by automatically selecting an odd or even horse or gate number of the most popular horse upon purchase for all races.

11. A method according to claim 8, wherein said ticket issuing step comprises vending picking tickets by automatically selecting an odd or even horse or gate number at random for all races.

12. A method according to claim 8, wherein said ticket issuing step comprises vending picking tickets by selecting an odd or even horse or gate number for all the races on the basis of read-out picking cards.

13. A method according to claim 8, wherein said ticket issuing step comprises selecting an odd or even horse or gate number as specified by a purchaser for all races as specified by the purchaser, and simultaneously, by automatically selecting an odd or even horse or gate number of a most popular horse at the time of purchase or specified at random for races not currently specified.

14. A method according to claim 8, wherein said repaying step comprises repaying a first prize money for a hit in all races, a second prize money for a loss in one race, and a third prize money for a loss in two races.

15. A computer readable storage for controlling a computer and comprising a program for picking a winning horse, the program comprising causing a computer to execute:

a ticket issuing step of vending picking tickets by selecting either an odd or even horse number of a horse expected to be first, or either an odd or even gate number of a horse expected to be first for all races to be held a day; and a repaying step of determining an amount of repayment by dividing a total amount of repayment accounting for a prescribed ratio to a total amount of purchases by a number of winning tickets.

* * * * *